(12) United States Patent
Mariyappan et al.

(10) Patent No.: US 12,165,306 B2
(45) Date of Patent: Dec. 10, 2024

(54) SEGMENTATION OF DESIGN CARE AREAS WITH A RENDERED DESIGN IMAGE

(71) Applicant: KLA Corporation, Milpitas, CA (US)

(72) Inventors: Manikandan Mariyappan, Chennai (IN); Jin Qian, Shanghai (CN); Zhuang Liu, Shanghai (CN); Xiaochun Li, San Jose, CA (US); Siqing Nie, Shanghai (CN)

(*) Notice: Subject to any disclaimer, the term of this patent is extended or adjusted under 35 U.S.C. 154(b) by 351 days.

(21) Appl. No.: 17/203,719

(22) Filed: Mar. 16, 2021

(65) Prior Publication Data

US 2022/0301133 A1 Sep. 22, 2022

(51) Int. Cl.
*G06T 7/00* (2017.01)
*G06T 7/11* (2017.01)

(52) U.S. Cl.
CPC .............. *G06T 7/001* (2013.01); *G06T 7/11* (2017.01); *G06T 2207/30148* (2013.01)

(58) Field of Classification Search
CPC .. G06T 7/001; G06T 7/11; G06T 2207/30148
See application file for complete search history.

(56) References Cited

U.S. PATENT DOCUMENTS

| | | | |
|---|---|---|---|
| 8,781,781 B2 | 7/2014 | Kulkarni et al. | |
| 8,831,334 B2* | 9/2014 | Luo | G06T 7/0004 382/173 |
| 8,923,600 B2 | 12/2014 | Zafar et al. | |
| 9,262,821 B2* | 2/2016 | Shifrin | G06T 7/001 |
| 9,727,047 B2* | 8/2017 | Luo | G05B 19/401 |
| 9,915,625 B2 | 3/2018 | Gao et al. | |
| 9,965,901 B2* | 5/2018 | Zhang | G06T 19/20 |
| 9,996,942 B2 | 6/2018 | Bhattacharyya et al. | |
| 10,127,652 B2* | 11/2018 | Gao | G06T 7/001 |
| 10,395,356 B2 | 8/2019 | Zhang et al. | |
| 10,832,396 B2* | 11/2020 | Duffy | G03F 1/84 |
| 10,922,808 B2* | 2/2021 | Brauer | H01L 21/67288 |
| 11,094,066 B2* | 8/2021 | Nie | G06T 7/187 |
| 11,113,827 B2* | 9/2021 | Brauer | H01L 23/544 |
| 2004/0240749 A1* | 12/2004 | Miwa | G06T 5/008 382/173 |
| 2006/0018521 A1* | 1/2006 | Avidan | G06V 40/165 382/118 |

(Continued)

FOREIGN PATENT DOCUMENTS

| | | | |
|---|---|---|---|
| KR | 20200089621 A | 7/2020 | |
| KR | 20200090117 A | 7/2020 | |

(Continued)

OTHER PUBLICATIONS

WIPO, International Search Report and Written Opinion for International Application No. PCT/US2021/026086, Dec. 14, 2021.

(Continued)

*Primary Examiner* — Manav Seth
(74) *Attorney, Agent, or Firm* — Hodgson Russ LLP (57) ABSTRACT

A rendered image is generated from a semiconductor device design file. The rendered image is segmented based on a grey level of the rendered image. Care areas are determined based on the segmenting. Defect inspection is performed in the care areas. This process can be performed on a wafer inspection tool that uses photon optics or electron beam optics.

10 Claims, 7 Drawing Sheets

(56) References Cited

U.S. PATENT DOCUMENTS

| | | | |
|---|---|---|---|
| 2015/0178907 A1* | 6/2015 | Zhang | G06T 7/001 382/149 |
| 2015/0179400 A1* | 6/2015 | Lauber | H01L 22/12 250/311 |
| 2015/0213189 A1* | 7/2015 | Oberai | G06F 30/398 716/52 |
| 2015/0324964 A1* | 11/2015 | Shifrin | G06T 7/001 382/151 |
| 2016/0104600 A1 | 4/2016 | Luo et al. | |
| 2016/0300338 A1* | 10/2016 | Zafar | G06F 18/22 |
| 2017/0161888 A1* | 6/2017 | Banerjee | G06T 7/337 |
| 2017/0191948 A1* | 7/2017 | Gao | G01N 21/95607 |
| 2018/0293721 A1 | 10/2018 | Gupta et al. | |
| 2019/0139208 A1* | 5/2019 | Chen | G06V 10/7515 |
| 2021/0010945 A1 | 1/2021 | Brauer et al. | |

FOREIGN PATENT DOCUMENTS

| | | | |
|---|---|---|---|
| TW | 202032090 A | 9/2020 | |
| WO | WO-2012148848 A2 * | 11/2012 | ....... G01N 21/95607 |
| WO | WO-2014205385 A1 * | 12/2014 | ........... G06T 7/0004 |
| WO | WO-2018175669 A1 * | 9/2018 | ......... G01N 21/8851 |

OTHER PUBLICATIONS

TW IPO, Office Action issued for TW Application No. 110110260, Mar. 13, 2024.

* cited by examiner

SEGMENTATION OF DESIGN CARE AREAS WITH A RENDERED DESIGN IMAGE

FIELD OF THE DISCLOSURE

This disclosure relates to inspection of semiconductor wafers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

Patterned wafer inspection tools use chip design information to target critical regions of interest (ROI) and avoid non-critical noisy regions on the wafer, which improves defect detection sensitivity in critical regions. Chip design information also is used for defect binning and grouping purposes during defect processing to further improve sensitivity. Known critical and noisy regions are processed in a computer readable form which can be fed to the inspection tool during inspection in the form of care areas (CAs). These care areas are aligned to the pattern printed on the wafer using subpixel alignment strategies. This technique can be used to identify and draw critical regions on the wafer is based on design geometry and can be created using specialized electronic design automation (EDA) tools.

To maximize sensitivity, noisy regions can be isolated from low noise regions in separate care areas which can then be inspected at comparatively higher sensitivities. With shrinking design rules and advances in chip manufacturing, the number of care areas that needs to be generated and processed during inspection is increasing. This has led to explosion in the number of care areas to several millions or even billions for every chip printed on a wafer because the feature dimensions of printed patterns may only be a few nanometers.

The chip design data is available in the form of a GDS/OASIS file. This information is used to create the photomask used for printing various structures on the wafer at a semiconductor fabrication facility. The GDS/OASIS file contains the blueprint of what is printed on the wafer. Various methods have been developed to use this information to improve inspection sensitivity and reduce nuisance by targeting critical regions by separating them from other regions in the form of care areas. Noisy and low noise regions on a design space can be identified after a first inspection of a wafer. Critical low noise regions are run at higher sensitivity while non-critical or noisy regions are run at lower sensitivity to maximize capture of defects of interest (DOI) while reducing the overall nuisance.

Figure 1:
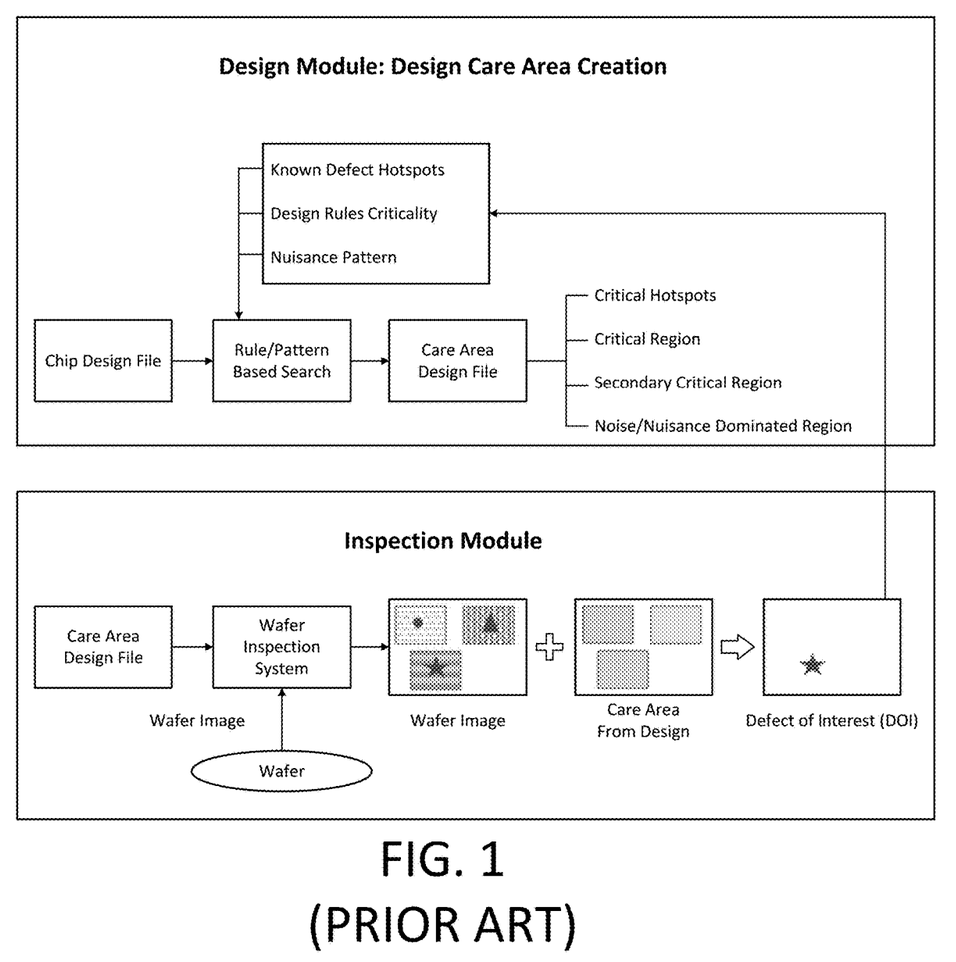
FIG. 1 illustrates a previous technique for care area creation.

The GDS or OASIS files are typically large, running into 10's of GB in size. Different component, material, and process information are separated in the design file into cells, layers, and sublayers. For each layer/sublayer, the spatial design data is stored in geometric shapes or polygons. To create care areas, a rule/pattern-based search was used to identify critical regions in this polygon space. Examples of critical regions include, for example, dense regions with tightly spaced polygons, sharp corners, line ends, isolated vias (metal contacts), or design hotspots that are more prone to failure during processing. These critical regions were grouped into separate care area groups based on their type and importance. Along with these care areas, known design hotspots that are prone to failure and known noise sources or patterns of low importance are also considered as separate care areas. These care areas are stored in a computer readable form that is readily-accessible to the inspection system during wafer inspection. This process of care area preparation is done before a wafer is inspected. During the inspection recipe creation, sample sections of a wafer are inspected with these care areas. Care area groups with lower noise and higher noise are identified and assigned different sensitivities to maximize sensitivity for critical patterns. During this process of optimizing the inspection recipe, a need for a new design care area can be identified, which among other methods can be based on scanning electron microscopy imaging to obtain ground truth, grouping nuisances to identify new noise regions of the design, and grouping DOIs to identify new design hotspots. In that case, the care area file is edited by creating and adding these new care areas and the inspection recipe creation/optimization process is reiterated. FIG. 1 illustrates an example of a previous technique to create care areas.

With shrinking design rules and advances in chip manufacturing, the number of polygons in the design file that needs to be processed to create design care areas has increased. This has led to long lead time for EDA processing to generate these care areas. The size of the care area design file also has increased, which adds to the cost and reduces throughput of the computer system that processes these care areas along with wafer images to identify defects. The increase in the number of care areas also has made assigning proper inspection sensitivities to these care areas difficult.

A rule-based/pattern-based search requires a pre-knowledge of potential defect type and/or pattern of interest. However, these aspects may not often be well understood or established before the inspection. A user would need to make a first order guess to generate care areas and go through several iterations to optimize the care areas. With more and more complicated GDS/OASIS design files, the time taken to run these iterations to extract care areas has grown.

Rule-based/pattern-based searches work on the original design polygons to extract care areas. However, due to the resolution limit of the optical inspection system, identical patterns in design may have different noise behavior due to other surrounding patterns which are half point spread function (PSF) away. Care areas generated from only a design, without considering optical characteristics may be sub-optimal. Creating complex rules incorporating the physics of optics on polygon space is computationally expensive and may not be efficient.

The current method of creating care areas on same design patterns may fail when same design patterns have different noise based on surrounding/under layer patterns. Improvements to methods and systems for creating care areas are needed to handle such complexities.

BRIEF SUMMARY OF THE DISCLOSURE

A method is provided in a first embodiment. The method includes generating, using a processor, a rendered image from a design file that includes a semiconductor device. The rendered image is segmented based on a grey level of the rendered image using the processor. The segmenting can use a brightness of the rendered image or a change in amplitude value surrounding a pixel of the rendered image. Care areas are determined based on the segmenting using the processor. Defect inspection is performed in the care areas using a wafer inspection tool.

The care areas can be determined from the rendered image by grouping pixels of similar grey levels.

The method can include imaging the semiconductor device on a wafer using the wafer inspection tool. The generating can occur after the imaging. The generating also can occur before the imaging, such as when the rendered image is stored on an electronic data storage unit.

A system is provided in a second embodiment. The system includes a light source that generates a beam of light, a detector that receives the beam of light reflected from a wafer, and a processor in electronic communication with the detector. The processor is configured to generate a rendered image from a design file that includes a semiconductor device; segment the rendered image based on a grey level of the rendered image; determine care areas based on the segmenting; and send instructions to perform defect inspection in the care areas. The segmenting can use a brightness of the rendered image or a change in amplitude value surrounding a pixel of the rendered image.

The system can include an electronic data storage unit that includes the design file. The electronic data storage unit is in electronic communication with the processor. The electronic data storage unit can be further configured to store the rendered image.

The care areas can be determined from the rendered image by grouping pixels of similar grey levels.

A non-transitory computer-readable storage medium is provided in a third embodiment. The non-transitory computer-readable storage medium includes one or more programs for executing steps on one or more computing devices. A rendered image is generated from a design file that includes a semiconductor device. The rendered image is segmented based on a grey level of the rendered image. The segmenting can use a brightness of the rendered image or a change in amplitude value surrounding a pixel of the rendered image. Care areas are determined based on the segmenting. Instructions to perform defect inspection in the care areas are generated.

The care areas can be determined from the rendered image by grouping pixels of similar grey levels.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Creation and/or segmentation of care areas is provided using simulated design image that is rendered to look similar to the optical image as seen by the inspection tool. In embodiments disclosed herein, creating or segmenting design care areas is based on rendered image based on the physics of the optics system. The chip design file can be rendered to closely match the wafer image as imaged by the inspection system. This rendered image can be created dynamically during inspection or can be created before inspection and saved to a database to be retrieved during inspection.

Figure 2:
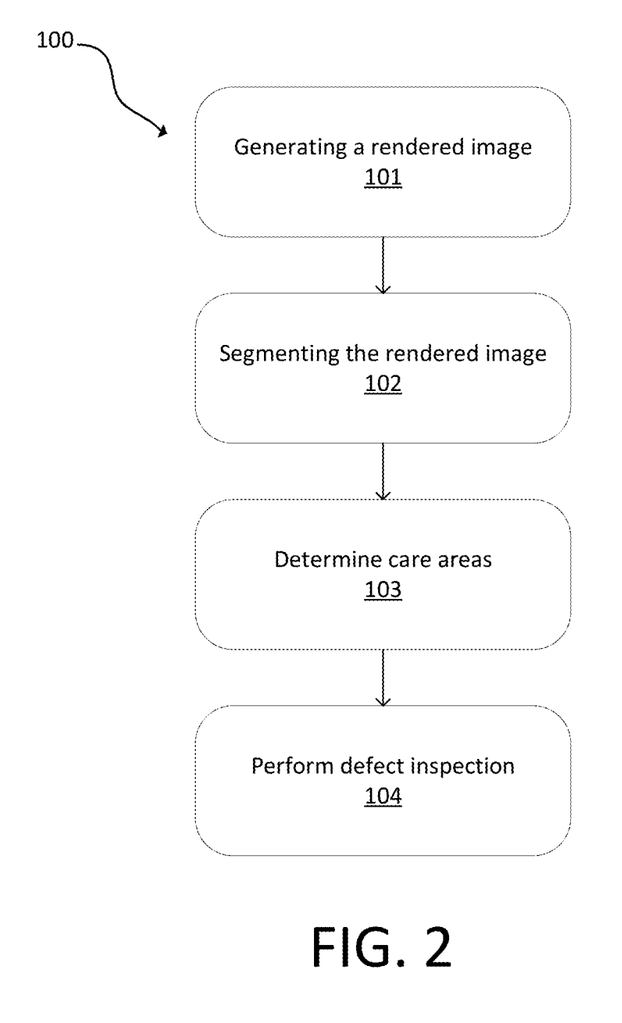
FIG. 2 is an embodiment of a method in accordance with the present disclosure.

FIG. 2 is an embodiment of a method 100. One or more of the steps of the method 100 can be performed using a processor. At 101, a rendered image is generated from a design file that includes a semiconductor device. In an embodiment, one or more rendered images can be generated to illustrate how different portions of the design will appear in images generated by the inspection tool. A design is rendered to an image that resembles the image seen by the inspection system by using a simulation model (e.g., an optical simulation) that closely models the inspection system. The model may be developed from Maxwell's equations and/or approximated to generate the image from the optical system. In an embodiment, an initial rendered image is generated that is a simulation of the image generated by the optical inspection subsystem for the design printed on the wafer based on the near field and an optical model of the optical inspection subsystem. The input to optical modeling may be the near field estimation and not the design database. For example, an optical model may use an estimated near field as an input to generate an initial rendered image. The optical model may model with and without aberrations of the optical inspection subsystem. Generating the initial rendered image may be performed using an incoherent model, a Partial Coherence Model, the Partial Coherence-Hopkins Formulation, a linear convolution model, a linear convolution model with Hermitian quadratic form, Robust Principal Component Analysis (Robust PCA), an Abbe imaging method, a rigorous EM model, and any other suitable approximation, function, or model known in the art. For example, generating a rendered image is described in U.S. Pat. No. 9,915,625, which is incorporated by reference in its entirety.

The model parameters can be iteratively changed by comparing the output of the model to an actual image from the inspection system and minimizing the difference, which iteratively improves the rendering. The processor may then render images from the design at each target. The difficulty of alignment between optical image(s) and design may be minimized by rendering a simulated image from design that appears substantially similar to image(s) that would be generated by the inspection subsystem for a wafer on which the design has been printed or formed to achieve reasonable alignment accuracy. To generate the accurate rendered images, the simulation can involve the simulation of electromagnetic (EM) field by solving Maxwell's equations from three-dimensional information for the chip design and material, followed by simulation of the optical (or electron beam) parameters of the inspection subsystem used to form an image of the specimen.

To learn the rendering parameters, wafer images and design on multiple locations of the wafer can be grabbed and processed. Learning the image rendering parameters can be performed in any suitable manner as in setting up and/or calibrating a simulation model or method. The simulation model can be a function of the optical properties of the inspection system.

Rendered images can be aligned to a wafer during inspection with alignment targets on the wafer and in the design. One or more images for each of the alignment targets can be aligned to a corresponding portion of a design for the wafer. Aligning such images to their corresponding portions of the design may be performed in a number of different manners. For example, such an image may be aligned to its corresponding portion of the design by pattern matching or any other suitable aligning method and/or algorithm known in the art. The one or more images that are aligned to their corresponding portions of the design may include different types of images described herein. In addition, the portions of the design used in this aligning step may include different types of information such as the design data itself or other types of design information described herein. This step may be performed during set up of an inspection process to be performed on the wafer with the inspection tool. Any image of a wafer can be aligned to the design for the wafer.

The rendered image is segmented based on a grey level of the rendered image at 102. A grey level of any pixel on the rendered image can be correlated to the pattern surrounding the pixel. For example, a pixel in a densely patterned region may be darker compared to a sparsely patterned region. Segmenting the grey levels can directly separate regions based on pattern density.

Horizontal and vertical brightness and roughness kernels on the rendered image can be used to segment locations based on horizontal pattern densities, vertical pattern densities, and/or sharp transition regions in X and Y directions, respectively. For example, segmenting can use brightness (amplitude) of the rendered image or a change in amplitude value (roughness) on a pixel or surrounding a pixel of the rendered image. A kernel can define the area surrounding the pixel to determine the change in amplitude. The size and shape of the kernel can be selected based on the size of the point spread function of the optical system or can be set to a constant value. Brightness kernels can help separate regions based on pattern density. Roughness kernels can help identify transition regions, such as edges of patterns and features that appear in a roughness kernel processing of rendered image.

Care areas are determined based on the segmenting at 103. These segmented pixels can be grouped and be directly used as care areas or the segmentation can be applied to design care areas already created by a pattern-based/rule-based search on polygon space. In an embodiment, the feature attributes can also be used as a feature axis in an outlier detection algorithm (like a multiple die auto-thresholding (MDAT) algorithm that is available from KLA Corporation) where the outliers in intensity (e.g., difference between the wafer image and reference image) corresponding to different feature values are flagged as defects. These different approaches for using these care areas are shown in FIGS. 3-6.

Generating care areas from an image is less complex than generating rule-based/pattern-based care areas. Care areas can be generated from rendered image by grouping pixels of similar grey levels in rendered image and/or in brightness or roughness images. This grouping can be accomplished automatically by an unsupervised algorithm, such as K-means clustering or a machine learning approach. In an embodiment using an unsupervised algorithm, the algorithm can split all the pixels on the rendered image into N care area groups based on the grey level values. For example, care areas or regions of interest can be generated on all pixels with less than 1000 grey level on a rendered image and from 100-400 grey level on a roughness image, though other values are possible. This approach simplifies generating care areas because it reduces computational resources compared to a rules-based approach. Also, since the rendered image is generated based on physical model of the optical system, the care areas tend to be more relevant.

Defect inspection in the care areas can be performed at 104. This can use a wafer inspection tool. After these pixels are grouped into care areas, the results can be saved in a computer readable format, such as on a non-transitory computer-readable storage medium, that the wafer inspection tool can apply during inspection by aligning the rendered image to the wafer image, which aligns the care areas to the wafer image.

Figure 3:
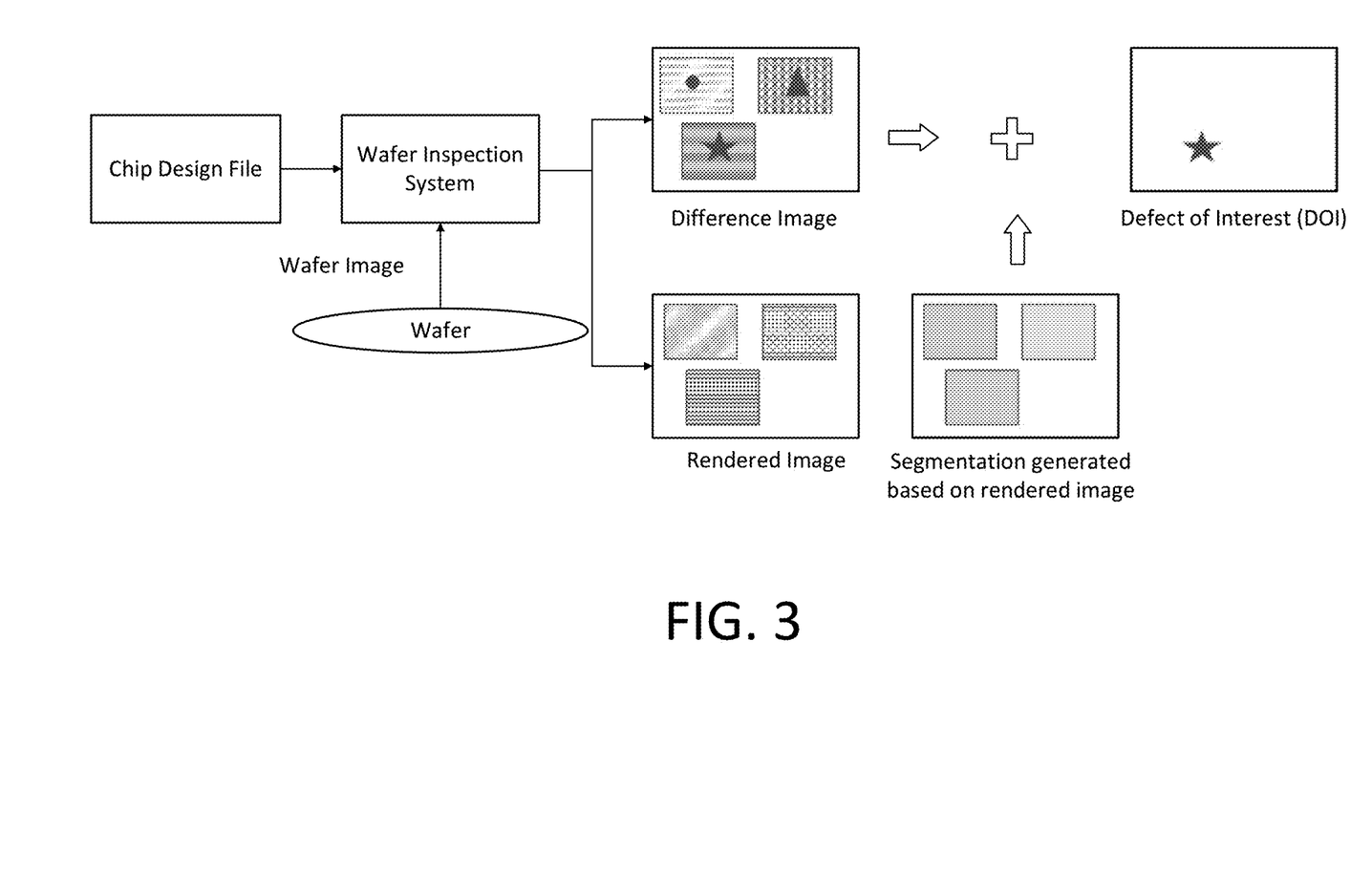
FIG. 3 illustrates dynamic rendering during wafer inspection and its segmentation.

FIG. 3 illustrates dynamic rendering during wafer inspection and its segmentation. The rendered image can be generated on-the-fly during the inspection process. The rendered image is used for segmenting the inspected regions of the wafer. Since rendered images are generated from a design with physical modelling of the inspection system, the segments can be more realistic and effective, which improves inspection sensitivity. This rendered image-based segmentation can be applied with design-generated care areas.

As shown in FIG. 3, a difference image can be used to identify defects on the wafer. The difference image can be between an image taken of the wafer and a sample image or an image of another die. The segmentation can generate care areas that can be applied to the difference image. Defects in the care areas may be DOIs. The defects in the care areas also can be further examined to determine which is a DOI.

Figure 4:
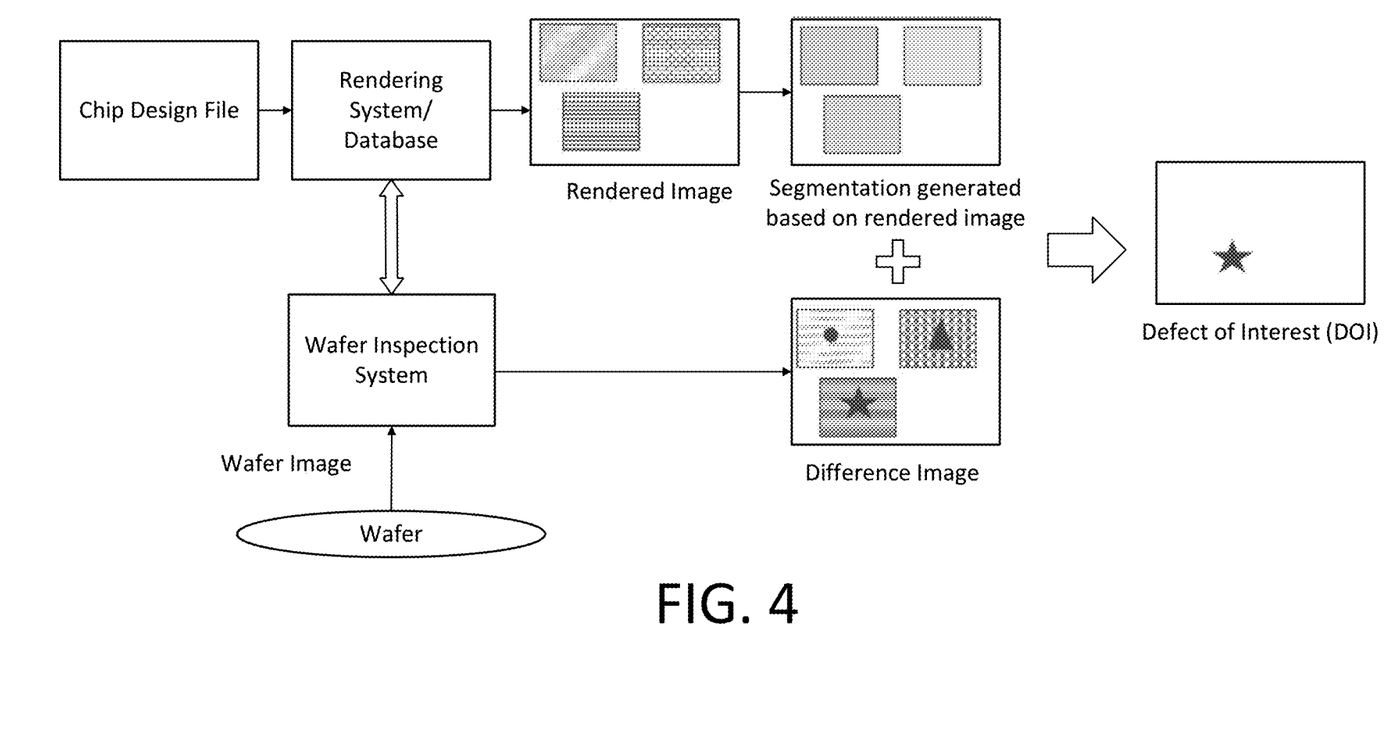
FIG. 4 illustrates a technique where a rendered image is saved and retrieved from a database during inspection and its segmentation.

FIG. 4 illustrates a technique where a rendered image is saved and retrieved from a database during inspection and its segmentation. Since rendered images are generated from a design, the rendered image can be used for registering the design and design-generated care areas. These rendered images are generated during pre-processing or during creation of an inspection recipe by a rendering system and saved to a database. The rendered image is then used for creating and segmenting regions of inspection.

Figure 5:
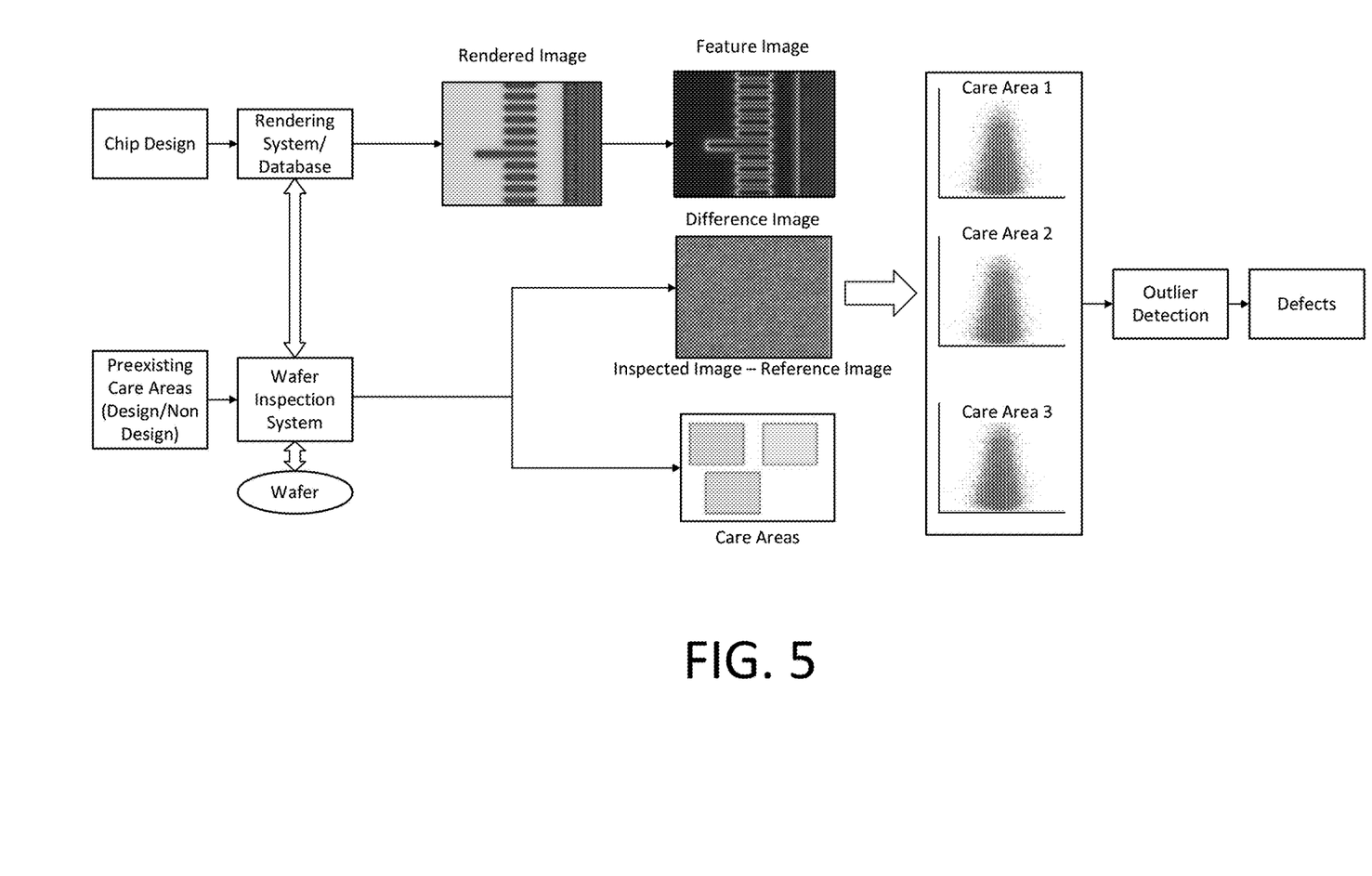
FIG. 5 illustrates a technique that uses the rendered image to create a feature axis for an outlier detection algorithm.

FIG. 5 illustrates a technique that uses the rendered image to create a feature axis for an outlier detection algorithm. Outliers can be identified using the rendered image. For example, outliers can be found in the X dimension, which represents the rendered image. The Y dimension can represent the difference image. In the three care area distribution charts of FIG. 5 ("Care Area 1," "Care Area 2," and "Care Area 3"), the x-axis is the difference axis from −100 to 100 and the y-axis is the feature axis from 0 to 4000.

Outliers on a difference image can be flagged as potential defects by a defect detection algorithm. Difference images are generated by subtracting test and reference images. A test image is from the location that is being inspected. A reference image can be the same location from an adjacent die, generated by a linear combination of multiple dies, or can be a saved image from a database. When all pixels are similar between test and reference images, the difference image will be uniformly zero gray level. When there are differences then there will be a noisy difference image. Defects tend to be stronger than other noise and will stand out from other pixels as an outlier. Weak defects can be get mixed up in noise and may be indistinguishable.

For example, smaller and denser patterns may be more difficult to manufacture and these locations may be noisier. If patterns are inspected together with a lower noise, sparser pattern region, defects may not be detected in both the regions because the noise from the denser region may dominate. However, if these two types of regions are segmented using the rendered image based segmentation, sensitivity can be increased in a sparser region. Outliers in a difference image are potential defects that are flagged by the wafer inspection tool.

Figure 6:
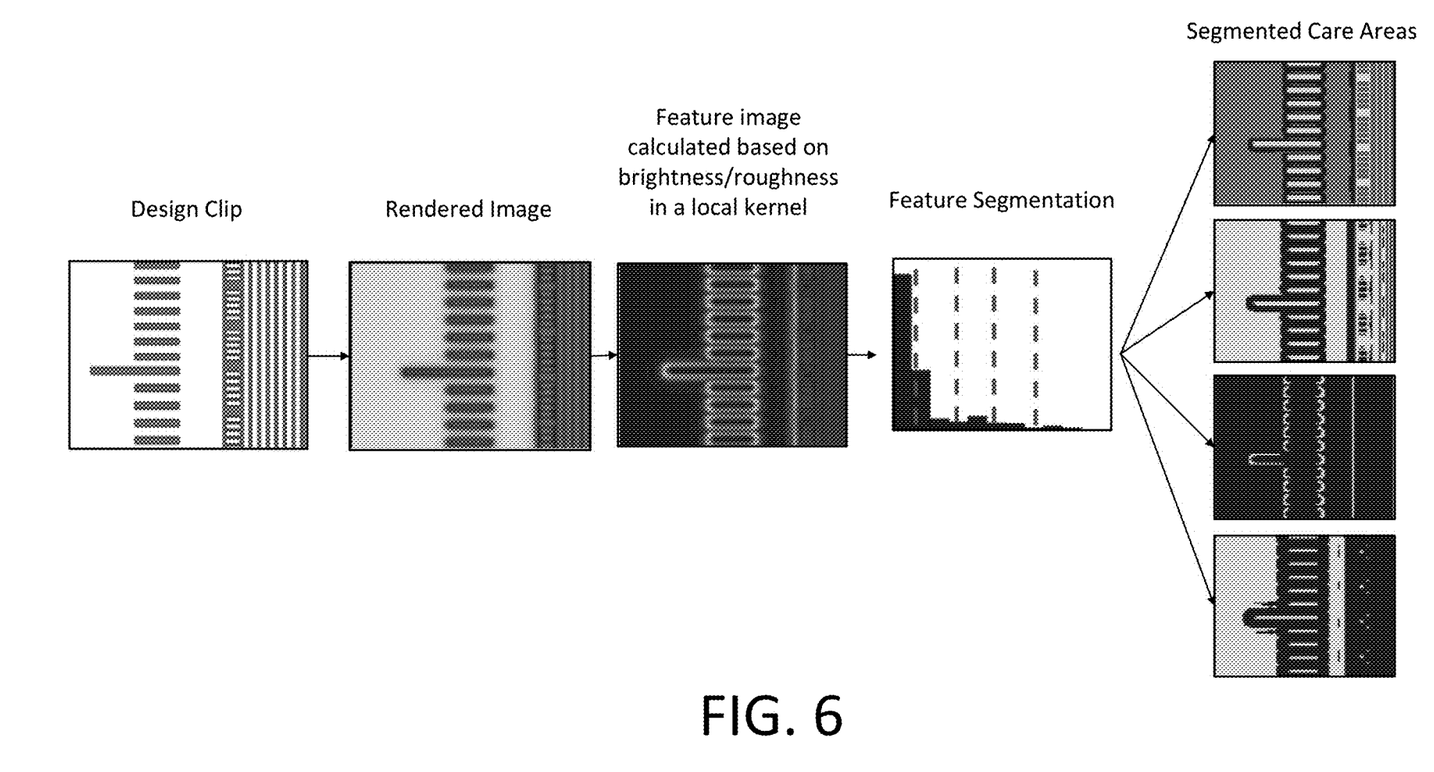
FIG. 6 illustrates care area segmentation using a rendered image.

FIG. 6 illustrates care area segmentation using a rendered image. In the feature segmentation chart of FIG. 6 (marked "Feature Segmentation"), the x-axis is the feature axis from 0 to 3000 and the y-axis is the pixel count from 0 to 7000. This is an example of how care areas can be created from rendered and/or feature images, such as using the method of FIG. 2 or FIG. 3. The feature image can be generated by processing the rendered image by convolution using a brightness or roughness kernel. Care areas can be created by grouping these pixels in one or more of these feature images. Working on an image space can be easier and more efficient than working on a polygon space. Converting a design from a polygon space to an image space and manipulation of the image can help segment the design care areas for enhanced sensitivity.

Figure 7:
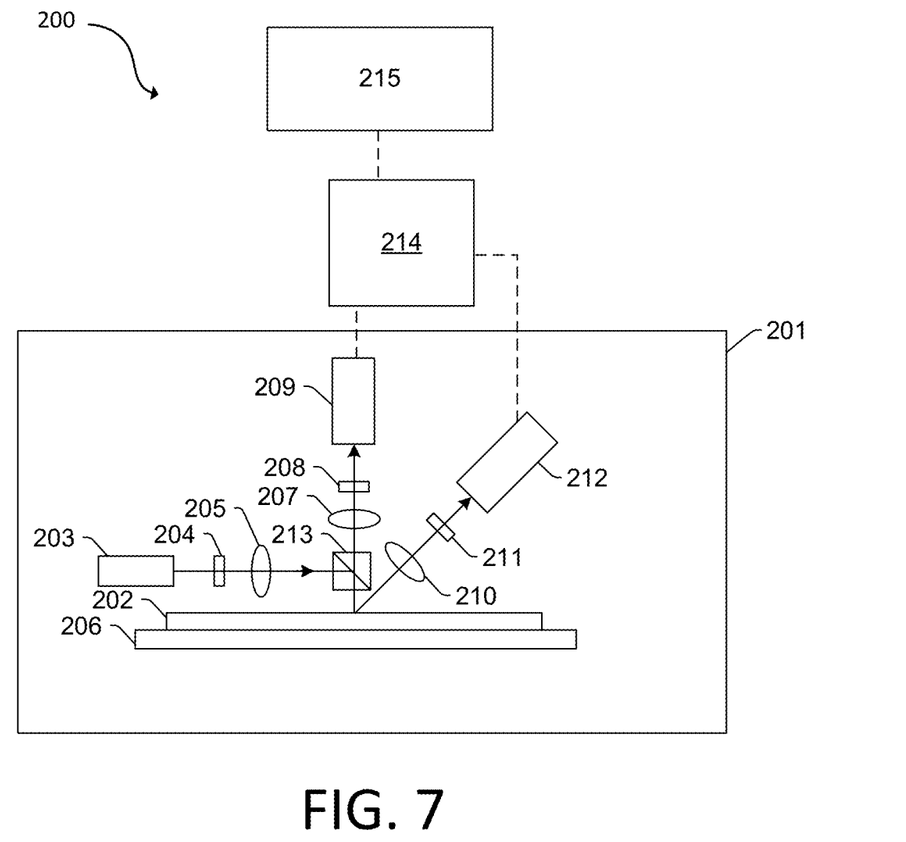
FIG. 7 is an embodiment of a system in accordance with the present disclosure.

One embodiment of a system 200 is shown in FIG. 7. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen 202 includes a reticle. The reticle may include any reticle known in the art.

In the embodiment of the system 200 shown in FIG. 7, optical based subsystem 201 includes an illumination subsystem configured to direct light to specimen 202. The illumination subsystem includes at least one light source. For example, as shown in FIG. 7, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 7, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 7. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 7 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 7) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 7 as a single refractive optical element, it is to be understood that, in practice, lens 205 may include a number of refractive and/or reflective optical elements that in combination focus the light from the optical element to the specimen. The illumination subsystem shown in FIG. 7 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 7 includes two detection channels, one formed by collector 207, element 208, and detector 209 and another formed by collector 210, element 211, and detector 212. As shown in FIG. 7, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 7, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 7 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 7 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 7 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 7 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with a scanning electron microscope.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 is configured to render an image from a design file, segment the rendered image, determine care areas, and send instructions to perform defect inspection using the system 200. For example, the processor 214 can perform the methods disclosed herein, such as those of FIGS. 2-6

An additional embodiment relates to a non-transitory computer-readable medium storing program instructions executable on a controller for performing a computer-implemented method for defect inspection, as disclosed herein. In particular, as shown in FIG. 7, electronic data storage unit 215 or other storage medium may contain non-transitory computer-readable medium that includes program instructions executable on the processor 214. The computer-implemented method may include any step(s) of any method(s) described herein, including method 100 or the embodiments of FIGS. 3-6.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

While disclosed with an optical system, the embodiments disclosed herein can be used with an electron beam system (e.g., a scanning electron microscope), a focused ion beam (FIB) system, a helium ion microscopy (HIM) system, or a secondary ion mass spectroscopy (SIMS) system.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
   generating, using a processor, a rendered image from a design file that includes a design of a semiconductor device;
   segmenting the rendered image based on a grey level of the rendered image using the processor, wherein one or more of horizontal brightness based on horizontal pattern densities, vertical brightness based on vertical pattern densities, or roughness kernels based on sharp transition regions in perpendicular directions on the rendered image are used during the segmenting;
   determining care areas of the rendered image based on the segmenting using the processor by grouping pixels of similar grey levels with an unsupervised algorithm, wherein the care areas include the pixels below a certain value of the grey level;
   imaging the semiconductor device on the wafer using an optical-based system to generate an image of the semiconductor device on a wafer, wherein the device is only part of the wafer; and
   performing defect inspection in the care areas using the optical-based system on the image in regions corresponding to the care areas of the rendered image.

2. The method of claim 1, wherein the segmenting uses a change in amplitude value surrounding a pixel of the rendered image.

3. The method of claim 1, wherein the generating occurs after the imaging.

4. The method of claim 1, wherein the generating occurs before the imaging, and wherein the rendered image is stored on an electronic data storage unit.

5. A system comprising:
   a light source that generates a beam of light;
   a detector that receives the beam of light reflected from a wafer; and
   a processor in electronic communication with the detector, wherein the processor is configured to:
      generate a rendered image from a design file that includes a design of a semiconductor device;
      segment the rendered image based on a grey level of the rendered image using one or more of horizontal brightness based on horizontal pattern densities, vertical brightness based on vertical pattern densities, or roughness kernels based on sharp transition regions in perpendicular directions on the rendered image;
      determine care areas of the rendered image based on the segmenting by grouping pixels of similar grey levels with an unsupervised algorithm, wherein the care areas include the pixels below a certain value of the grey level;
      send instructions to image the semiconductor device on the wafer using the beam of light, wherein the device is only part of the wafer; and
      send instructions to perform defect inspection in the care areas on the image in regions corresponding to the care areas of the rendered image.

6. The system of claim 5, further comprising an electronic data storage unit that includes the design file, wherein the electronic data storage unit is in electronic communication with the processor.

7. The system of claim 6, wherein the electronic data storage unit is further configured to store the rendered image.

8. The system of claim 5, wherein the segmenting uses a change in amplitude value surrounding a pixel of the rendered image.

9. A non-transitory computer-readable storage medium, comprising one or more programs for executing the following steps on one or more computing devices:
   generating a rendered image from a design file that includes a design of a semiconductor device;
   segmenting the rendered image based on a grey level of the rendered image, wherein one or more of horizontal brightness based on horizontal pattern densities, vertical brightness based on vertical pattern densities, or roughness kernels based on sharp transition regions in perpendicular directions on the rendered image are used during the segmenting;
   determining care areas of the rendered image based on the segmenting by grouping pixels of similar grey levels with an unsupervised algorithm, wherein the care areas include the pixels below a certain value of the grey level;
   generating instructions to image the semiconductor device using an optical-based system, wherein the device is only part of the wafer; and
   generating instructions to perform defect inspection in the care areas on the image in regions corresponding to the care areas of the rendered image.

10. The non-transitory computer-readable storage medium of claim 9, wherein the segmenting uses a change in amplitude value surrounding a pixel of the rendered image.

* * * * *